(12) United States Patent
Fan et al.

(10) Patent No.: US 7,724,419 B1
(45) Date of Patent: May 25, 2010

(54) DISPLAY

(75) Inventors: Shih-Kang Fan, Hsinchu (TW);
Cheng-Pu Chiu, Taipei County (TW);
Ching-Hsiang Hsu, Hsinchu (TW);
Chi-Neng Mo, Taoyuan County (TW);
Mei-Tsao Chiang, Taoyuan County (TW)

(73) Assignees: Chungwa Picture Tubes, Ltd., Taoyuan (TW); National Chiao Tung University, Hsinchu (TW)

( * ) Notice: Subject to any disclaimer, the term of this patent is extended or adjusted under 35 U.S.C. 154(b) by 0 days.

(21) Appl. No.: 12/419,307

(22) Filed: Apr. 7, 2009

(30) Foreign Application Priority Data

Dec. 11, 2008 (TW) .............................. 97148264 A

(51) Int. Cl.
*G02B 26/00* (2006.01)
*G09G 3/34* (2006.01)

(52) U.S. Cl. ...................... 359/296; 359/245; 345/107; 349/107; 349/117

(58) Field of Classification Search ................. 359/245, 359/251–253, 296; 345/82, 106, 107, 204; 349/42, 65, 67, 84, 86, 89, 141, 149, 156, 349/166, 167, 187
See application file for complete search history.

(56) References Cited

U.S. PATENT DOCUMENTS

| 3,512,876 | A | * | 5/1970 | Marks | 359/296 |
|---|---|---|---|---|---|
| 6,337,729 | B1 | * | 1/2002 | Morii | 349/155 |
| 6,441,881 | B1 | * | 8/2002 | Enomoto et al. | 349/156 |
| 7,106,297 | B2 | | 9/2006 | Shannon et al. | |
| 7,463,328 | B2 | * | 12/2008 | Nakamura et al. | 349/167 |
| 7,573,553 | B2 | * | 8/2009 | Itou et al. | 349/117 |
| 2005/0024710 | A1 | | 2/2005 | Kanbe | |

FOREIGN PATENT DOCUMENTS

TW I251710 3/2006

OTHER PUBLICATIONS

Chiu, et al., "Reflective electronic paper display utilizing electric polarized particle chains", SID 07 Digest, 2007, p. 1466-1469.
Microcup Electronic Paper, <http://sipix.com/>, Sipix Microcup 2007.

\* cited by examiner

*Primary Examiner*—Loha Ben
(74) *Attorney, Agent, or Firm*—Jianq Chyun IP Office

(57) ABSTRACT

A display includes a first substrate, a first electrode, a second substrate, a second electrode and a display material layer. The first electrode is disposed on the first substrate and the second electrode is disposed on the second substrate. The display material layer is disposed between the first electrode and the second electrode. The display material layer of the invented display includes a solution and a plurality of first micro beads, wherein each of the first micro beads further has a plurality of different axis lengths in different axis directions, and the axis length in at least an axis direction is different from the axis lengths in the rest axis directions so that the first micro beads present different arrangement densities in different driving frequencies under the influence of polarized self-arrangement effect.

16 Claims, 4 Drawing Sheets

DISPLAY

CROSS-REFERENCE TO RELATED APPLICATION

This application claims the priority benefit of Taiwan application serial no. 97148264, filed on Dec. 11, 2008. The entirety of the above-mentioned patent application is hereby incorporated by reference herein and made a part of specification.

BACKGROUND OF THE INVENTION

1. Field of the Invention

The present invention generally relates to a display, and more particularly, to a display taking advantage of polarizing phenomena of micro beads.

2. Description of Related Art

The E-paper display technique was initiated in 1970's which is featured with employing micro-spheres with charges, wherein a micro-sphere has white color on a side and black color on the other side. The micro-spheres rotate up-and-down to present different colors along with changing an applied electric field. The second generation of the E-paper display technique was developed in 1990's, which is featured with employing micelles instead of the traditional micro-spheres, wherein each of the micelles is filled with liquid and particles with charges, and the particles with charges move up or down when controlled by an external electric field. When a particle moves upwards (in the direction approaching the reader), the particle presents the color of its own, and the conventional technique is based on the mechanism of the electrophoresis the particles with charges demonstrate to achieve displaying function. In addition, the common E-paper display technique further includes other modes which are based on different techniques, such as electronic powder technique, charged macromolecule particle technique, cholesterol liquid crystal technique, and electronic humidification technique.

The gradually evolved E-paper display technique has attracted the relevant manufactures including many giant companies for research and development. However, the E-paper display technique with simple driving mode and fast response still remains unsolved today and becomes an important development project.

SUMMARY OF THE INVENTION

Accordingly, the present invention is directed to a display advantageous in simple driving and fast response plus better displaying quality.

The present invention provides a display, which includes a first substrate, a first electrode, a second substrate, a second electrode and a display material layer. The first electrode is disposed on the first substrate; the second electrode is disposed on the second substrate. The display material layer is disposed between the first electrode and the second electrode, wherein the display material layer includes a solution and a plurality of first micro beads disposed in the solution, wherein each of the first micro beads has a plurality of different axis lengths in different axis directions, and the axis length in at least an axis direction is different from the axis lengths in the rest of the axis directions so that the first micro beads present different arrangement densities in different first driving frequencies under the influence of polarized self-arrangement effect.

In an embodiment of the present invention, each of the above-mentioned first micro beads is ellipsoid, cubic, cuboid, tetrahedron or other nonspheric beads.

In an embodiment of the present invention, the above-mentioned display further includes a plurality of second micro beads disposed in the solution, wherein each of the second micro beads has a plurality of different axis lengths in different axis directions, and the axis length in at least an axis direction is different from the axis lengths in the rest of the axis directions so that the second micro beads present different arrangement densities in different second driving frequencies under the influence of polarized self-arrangement effect.

In an embodiment of the present invention, the above-mentioned display further includes a plurality of third micro beads disposed in the solution, wherein each of the third micro beads has a plurality of different axis lengths in different axis directions, and the axis length in at least an axis direction is different from the axis lengths in the rest of the axis directions so that the third micro beads present different arrangement densities in different third driving frequencies under the influence of polarized self-arrangement effect.

In an embodiment of the present invention, the conductivity of the above-mentioned display takes a negative correlation to the conductivity of the solution.

In an embodiment of the present invention, the dielectric coefficient of the above-mentioned display takes a negative correlation to the dielectric coefficient of the solution.

In an embodiment of the present invention, the above-mentioned first micro beads include metal beads.

In an embodiment of the present invention, the above-mentioned first micro beads include macromolecule beads.

In an embodiment of the present invention, the material of the above-mentioned first micro beads includes polystyrene beads.

In an embodiment of the present invention, the material of the above-mentioned first micro beads includes polyethylene beads.

In an embodiment of the present invention, the above-mentioned solution is a nonconductive solution.

In an embodiment of the present invention, the above-mentioned display further includes a first dielectric layer, a first hydrophobic film layer and a second hydrophobic film layer, wherein the first dielectric layer is disposed on the first electrode, the first hydrophobic film layer is disposed on the first dielectric layer and the second hydrophobic film layer is disposed on the second electrode.

In an embodiment of the present invention, the above-mentioned solution is a conductive solution.

In an embodiment of the present invention, the above-mentioned first electrode is a reflecting electrode.

In an embodiment of the present invention, the above-mentioned second electrode is transparent electrode.

In an embodiment of the present invention, the above-mentioned first substrate and second substrate include a flexible substrate.

Based on the description above, the first micro beads in the invented display are polarized due to the electric field between the first electrode and the second electrode so as to cause polarized self-arrangement effect. The first micro beads with the self-arrangement further take chain structures so that the distribution density of the first micro beads in the display gets changed, which further change the transparence of the display material layer. It should be noted that since the first micro beads are nonspheric like, so that the first micro beads with different axis lengths in different axis directions for each microbead would have different polarized extents under the driving electric field in different driving frequencies and accordingly form chain structures with different distribution densities. In this way, when light from outside is incident upon the display and then reflected outwards by the first electrode, the desired variation of luminance or greylevel of the display can be achieved by controlling the driving frequency.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
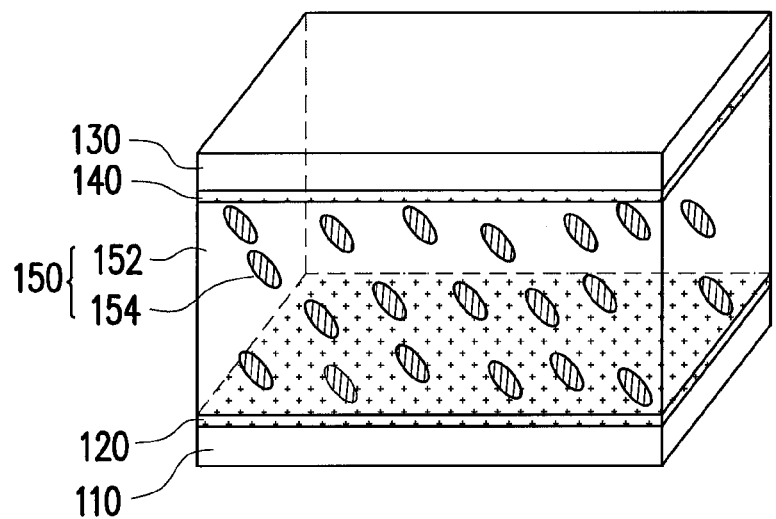
FIG. 1A is a sectional-view diagram of a display according to the first embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

The First Embodiment

Figure 1B:
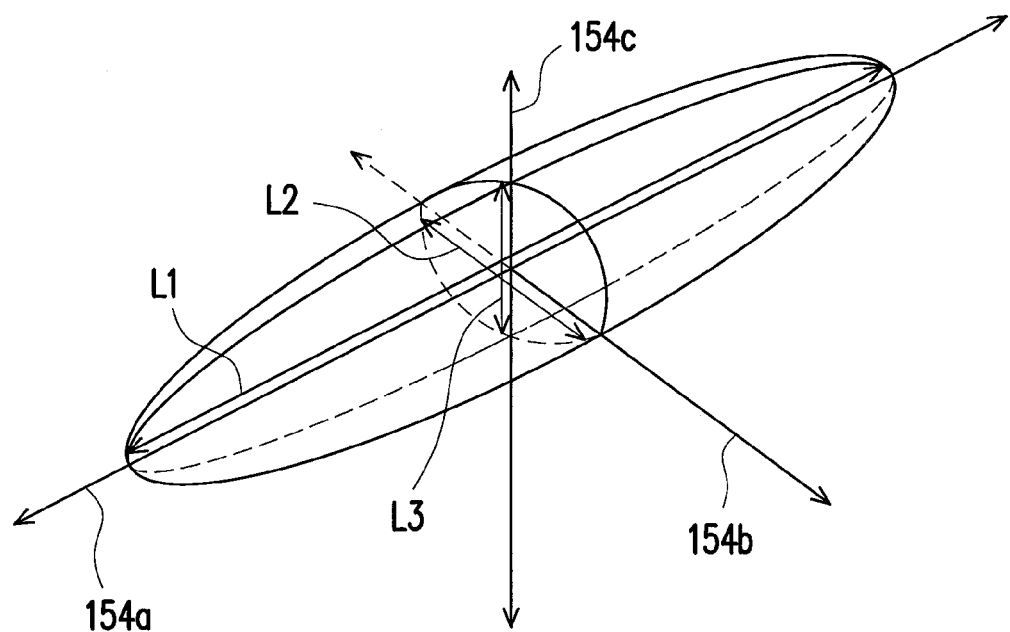
FIG. 1B is a 3-dimensions diagram of a first microbead in FIG. 1A.

FIG. 1A is a sectional-view diagram of a display according to the first embodiment of the present invention and FIG. 1B is a 3-dimensions diagram of a first microbead in FIG. 1A. Referring to FIGS. 1A and 1B, a display 100 of the present invention includes a first substrate 110, a first electrode 120, a second substrate 130, a second electrode 140 and a display material layer 150. The first electrode 120 is disposed on the first substrate 110 and the second electrode 140 is disposed on the second substrate 130. In the embodiment, the first substrate 110 and the second substrate 130 can be a flexible substrate with flexibility; however in other embodiments, the first substrate 110 and the second substrate 130 can be, for example, a glass substrate or other substrates made of organic compound or inorganic compound.

In the embodiment, the first electrode 120 is, for example, a reflecting electrode and the second electrode 140 is, for example, a transparent electrode. In more details, the first electrode 120 can be made of metal material with high reflectance, and the second electrode 140 can be made of indium tin oxide (ITO), indium zinc oxide (IZO), indium tin zinc oxide (ITZO), hafnium oxide, zinc oxide, aluminum oxide, aluminum tin oxide, aluminum zinc oxide, cadmium tin oxide, cadmium zinc oxide or other appropriate transparent conductive materials.

The display material layer 150 in the invented display 100 is disposed between the first electrode 120 and the second electrode 140 and includes a solution 152, which contains a plurality of first micro beads 154 dispersedly distributed therein, as shown in FIG. 1A. Specially, each of the first micro beads 154 has a plurality of different axis lengths in different axis directions and the axis length in at least an axis direction is different from the axis lengths in the rest of the axis directions so that the first micro beads 154 present different arrangement densities in different first driving frequencies under the influence of polarized self-arrangement effect.

Although the embodiment is depicted against the first micro beads 154 shown in FIG. 1B, but the embodiment of the present invention is not limited thereto. In FIG. 1B, each of the first micro beads 154 has three different axis directions 154a, 154b and 154c and three axis lengths $L_1$, $L_2$ and $L_3$ respectively corresponding to 154a, 154b and 154c, wherein the axis lengths $L_1$, $L_2$ and $L_3$ respectively corresponding to 154a, 154b and 154c are different from each other. In this way, when an AC voltage with different first driving frequencies is applied between the first electrode 120 and the second electrode 140, the first micro beads 154 would have different dipole moments corresponding to different axis directions, which further results in forming string-like chain structures arranged with different densities. For example, if the axis lengths $L_1$, $L_2$ and $L_3$ respectively corresponding to the axis directions 154a, 154b and 154c are different from each other, the first micro beads 154 can form string-like chain structures arranged along at least one of the axis directions 154a, 154b and 154c under an AC voltage of at least the above-mentioned three different first driving frequencies. In this way, the arrangement density on a plane and the corresponding polarized self-arrangement are varied with the first driving frequency, which results in different transparence.

Figure 1C:
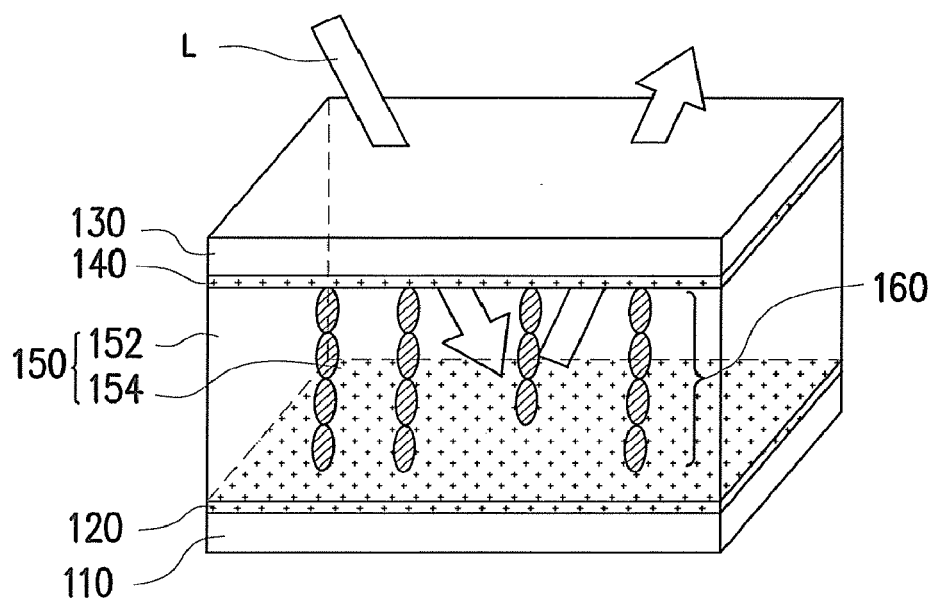
FIGS. 1C and 1D are diagrams showing different polarized self-arrangements of the first micro beads under different first driving frequencies.
Figure 1D:
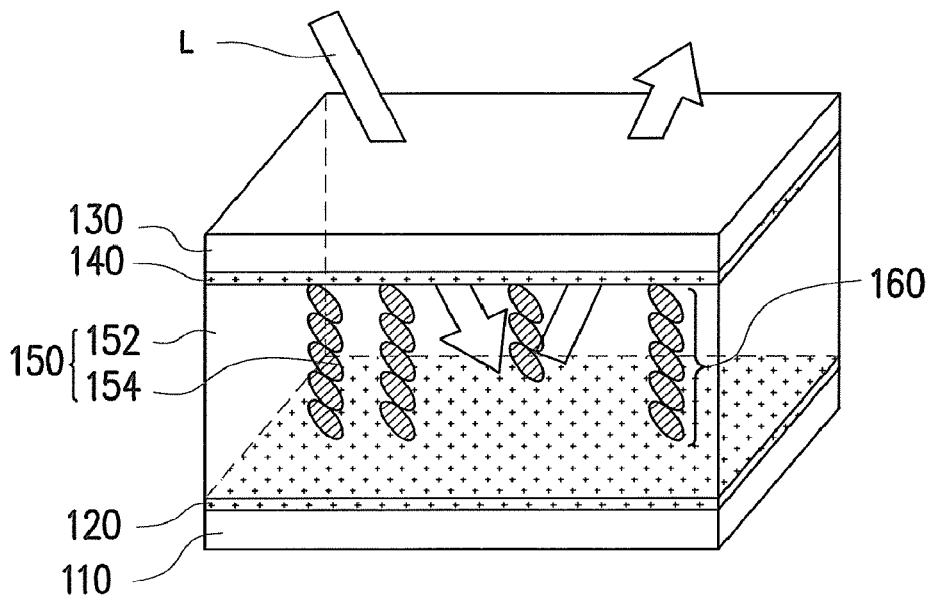

FIGS. 1C and 1D are diagrams showing different polarized self-arrangements of the first micro beads under different first driving frequencies. The polarized self-arrangement effect with different arrangement densities of the first micro beads 154 in the display 100 under different first driving frequencies can be explained in FIGS. 1C and 1D.

Referring to FIG. 1C, if an AC voltage with 48 V and 500 kHz is applied between the first electrode 120 and the second electrode 140, an electric field is produced therebetween. In the influence of the external electric field with the frequency of 500 kHz, the first micro beads 154 get polarized. Specially, the polarized first micro beads 154 would attract each other to cause the polarized self-arrangement effect. As shown in FIG. 1C, the first micro beads 154 form chain structures 160, so that the distribution density of the first micro beads 154 is changed, and thereby the transparence of the display material layer 150 is changed. In this way, external light L can be easily incident upon the second electrode 140 and then reflected by the first electrode 120 outwards to realize displaying effect.

Along with changing the frequency of the above-mentioned applied AC voltage, the polarized first micro beads 154 keep attracting each other to form self-arrangement, but due to different axis lengths for different axis directions as shown by FIG. 1B, the polarized first micro beads 154 are self-arranged in different way as shown in FIG. 1D, which makes the arrangement density on a plane of the chain structures 160 increased or decreased and the desired luminance and greylevel are accordingly obtained by the frequency adjustment. It should be noted that, the chain structures 160 under an AC signal of different driving frequencies can have other arrangements; for example, the first micro beads 154 can be arranged along the axis direction 154a, the axis direction 154b or the axis direction 154c. In short, the display 100 of the embodiment only requires appropriate driving frequencies to produce different luminance and greylevels, therefore, the invented display has better displaying quality.

In the embodiment, when the operation frequency for producing the electric field between the first electrode 120 and the second electrode 140 is a low-frequency (for example, DC-MHz), the conductivity of the first micro beads 154 takes a negative correlation to the conductivity of the solution 152. The first micro beads 154 with high conductivity corresponding to the solution 152 with low conductivity or the first micro beads 154 with low conductivity corresponding to the solution 152 with high conductivity are shown in Table 1.

On the other hand, when the operation frequency for producing the electric field between the first electrode 120 and the second electrode 140 is a high-frequency (for example, MHz-GHz), the dielectric coefficient of the first micro beads 154 takes a negative correlation to the dielectric coefficient of the solution 152. The first micro beads 154 with high dielectric coefficient corresponding to the solution 152 with low dielectric coefficient or the first micro beads 154 with low dielectric coefficient corresponding to the solution 152 with high dielectric coefficient are also shown in Table 1.

TABLE 1

| operation frequency | first micro beads | solution |
| --- | --- | --- |
| low-frequency | high conductivity | low conductivity |
| low-frequency | low conductivity | high conductivity |
| high-frequency | high dielectric coefficient | low dielectric coefficient |
| high-frequency | low dielectric coefficient | high dielectric coefficient |

It should be noted that the solution 152 can be nonconductive solution matching the first micro beads 154 with high conductivity. The solution 152 can be also conductive solution, which is depicted in the second embodiment. In more details, the first micro beads 154 include macromolecule beads or metal beads. In terms of macromolecule beads, they are, for example, polystyrene beads (PS beads) or polyethylene beads (PE beads), wherein the diameter of the first microbead 154 is, for example, 3 μm.

When the first micro beads 154 are not polarized by electric field, the first micro beads 154 are distributed as shown in FIG. 1A, so that light can not be effectively incident upon the second electrode 140 from outside and reflected by the first electrode 120 outwards. In other words, since the display 100 of the embodiment employs nonspheric beads as the first micro beads 154, the distribution of the first micro beads 154 can be controlled by applying different electric fields, which further controls the display 100 to produce desired frames with different luminance and greylevels. The display 100 of the embodiment is advantageous in not only simple driving structure, low driving voltage and fast response, but also better displaying quality with appropriate greylevels.

The shape of the above-mentioned first micro beads 154 in FIG. 1B is an example only; in other unshown embodiments, the first micro beads 154 can be cubic, cuboid, tetrahedron or other nonspheric beads.

Figure 2:
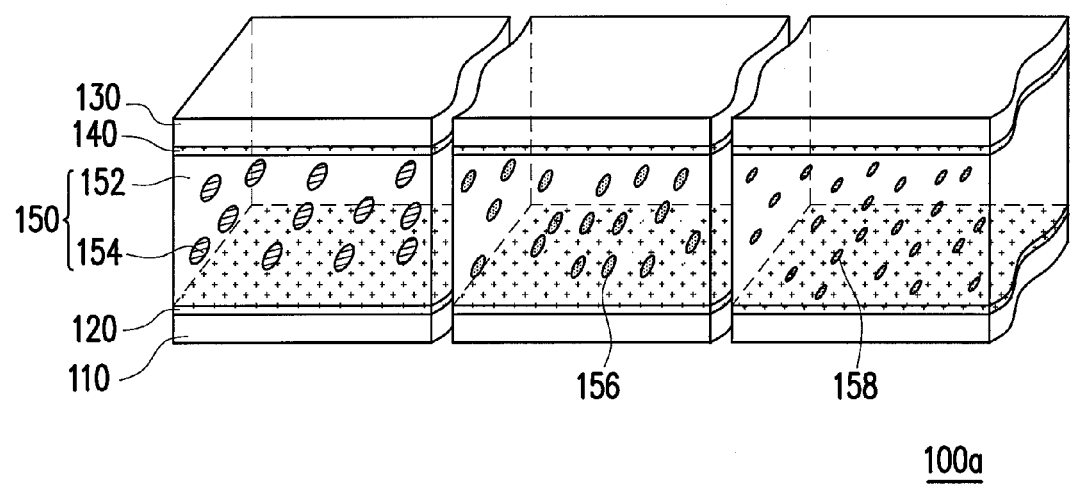
FIG. 2 is a sectional-view diagram of another display according to the first embodiment of the present invention.

To meet the requirement of full color displaying, another display 100a of the present invention, as shown in FIG. 2, can further include a plurality of second micro beads 156 and a plurality of third micro beads 158. The second micro beads 156 and the third micro beads 158 herein are distributed in the solution 152, wherein the second micro beads 156 and the third micro beads 158 work, for example, the same as the first micro beads 154, and they are omitted for simplicity.

In an embodiment, the first micro beads 154 can be red micro beads; the second micro beads 156 ones and the third micro beads 158, blue ones. However, the first micro beads 154, the second micro beads 156 and the third micro beads 158, respectively, require different driving frequencies, i.e., a first driving frequency, a second driving frequency and a third driving frequency, so that the luminance and the greylevel of the display 100a can be controlled. In this way, the first micro beads 154, the second micro beads 156 and the third micro beads 158 present different polarizations under driving voltages with different frequencies and form chain structures 160 with different densities on a plane, where different colors and greylevels of frames can be effectively controlled by varying the frequency of the AC driving voltage.

The Second Embodiment

Figure 3:
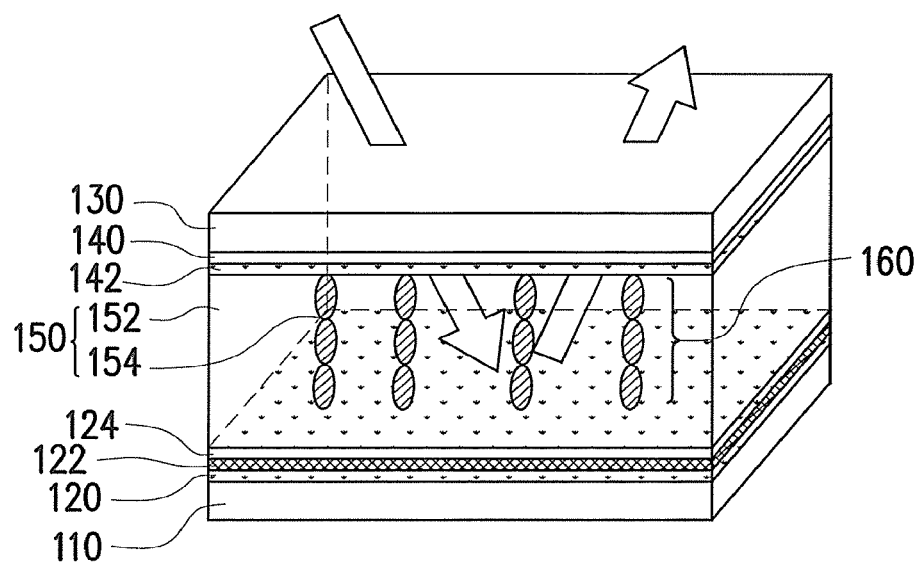
FIG. 3 is a sectional-view diagram of a display according to the second embodiment of the present invention.

The second embodiment is similar to the first embodiment except that the solution employed by the second embodiment is conductive solution. Besides, the display further employs a dielectric layer and two hydrophobic film layers disposed on the first electrode and the second electrode. FIG. 3 is a sectional-view diagram of a display according to the second embodiment of the present invention. Referring to FIG. 3, a display 200 is similar to the display 100 of the first embodiment. The uniqueness of the display 200 of the embodiment rests in that the solution 152 is conductive solution and the display 200 further includes a first dielectric layer 122, a first hydrophobic film layer 124 and a second hydrophobic film layer 142. The first dielectric layer 122 and the first hydrophobic film layer 124 herein are sequentially disposed on the first electrode 120, and the second hydrophobic film layer 142 is disposed on the second electrode 140. The display 200 of the embodiment has the same advantages as the display 100 of the first embodiment, i.e., simple driving structure, fast response, low driving voltage and better displaying quality with appropriate greylevels.

In summary, the first micro beads of the invented display are polarize in the influence of the electric field between the first electrode and the second electrode, so that the first micro beads are self-arranged and form chain structures due to the self-arrangement, which makes the distribution density of the first micro beads in the display and the transparence of the display material layer changed to produce different displaying frames. Therefore, the display of the present invention has the advantages of simple driving structure and fast response. In addition, by employing various kinds of micro beads, the display of the present invention can achieve the goal of full color displaying.

It will be apparent to those skilled in the art that various modifications and variations can be made to the structure of the present invention without departing from the scope or spirit of the invention. In view of the foregoing, it is intended that the present invention covers modifications and variations of this invention provided they fall within the scope of the following claims and their equivalents.

What is claimed is:

1. A display, comprising:
a first substrate;
a first electrode, disposed on the first substrate;
a second substrate;
a second electrode, disposed on the second substrate; and
a display material layer, disposed between the first electrode and the second electrode, wherein the display material layer comprises:
a solution; and
a plurality of first micro beads disposed in the solution, wherein each of the first micro beads has a plurality of different axis lengths in different axis directions, and the axis length in at least an axis direction is different from the axis lengths in the rest of the axis directions so that the first micro beads present different arrangement densities in different first driving frequencies under the influence of polarized self-arrangement effect.

2. The display as claimed in claim 1, wherein each of the first micro beads is ellipsoid, cubic, cuboid, tetrahedron or other nonspheric bead.

3. The display as claimed in claim 1, further comprising a plurality of second micro beads disposed in the solution, wherein each of the second micro beads has a plurality of different axis lengths in different axis directions, and the axis length in at least an axis direction is different from the axis lengths in the rest of the axis directions so that the second micro beads present different arrangement densities in different second driving frequencies under the influence of polarized self-arrangement effect.

4. The display as claimed in claim 3, further comprising a plurality of third micro beads disposed in the solution, wherein each of the third micro beads has a plurality of different axis lengths in different axis directions, and the axis length in at least an axis direction is different from the axis lengths in the rest of the axis directions so that the third micro beads present different arrangement densities in different third driving frequencies under the influence of polarized self-arrangement effect.

5. The display as claimed in claim 1, wherein the conductivity of the first micro beads takes a negative correlation to the conductivity of the solution.

6. The display as claimed in claim 1, wherein the dielectric coefficient of the first micro beads takes a negative correlation to the dielectric coefficient of the solution.

7. The display as claimed in claim 1, wherein the first micro beads comprise metal beads.

8. The display as claimed in claim 1, wherein the first micro beads comprise macromolecule beads.

9. The display as claimed in claim 8, wherein the material of the first micro beads comprises polystyrene beads.

10. The display as claimed in claim 1, wherein the material of the first micro beads comprises polyethylene beads.

11. The display as claimed in claim 1, wherein the solution is a nonconductive solution.

12. The display as claimed in claim 1, further comprising:
a first dielectric layer, disposed on the first electrode;
a first hydrophobic film layer, disposed on the first dielectric layer; and
a second hydrophobic film layer, disposed on the second electrode.

13. The display as claimed in claim 12, wherein the solution is a conductive solution.

14. The display as claimed in claim 1, wherein the first electrode is a reflecting electrode.

15. The display as claimed in claim 1, wherein the second electrode is a transparent electrode.

16. The display as claimed in claim 1, wherein the first substrate and the second substrate each comprise flexible substrate.

* * * * *